June 3, 1969     T. W. KLEIMAN     3,447,173
FISHING LINE CLIPPER
Filed May 29, 1967
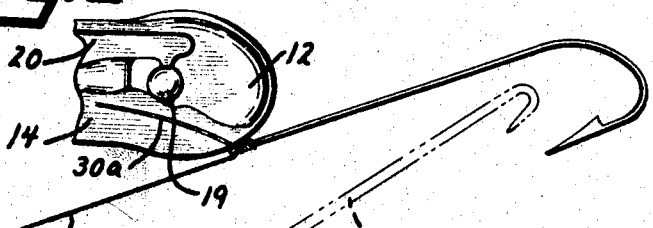
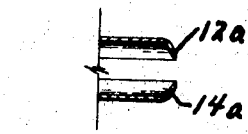
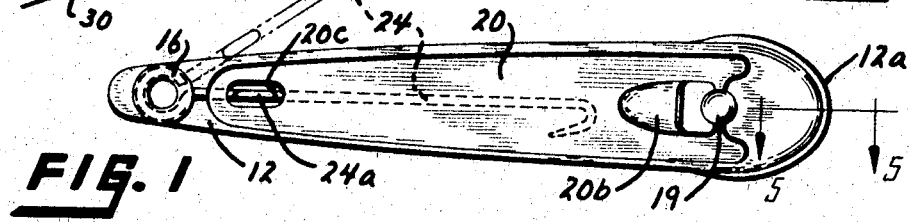
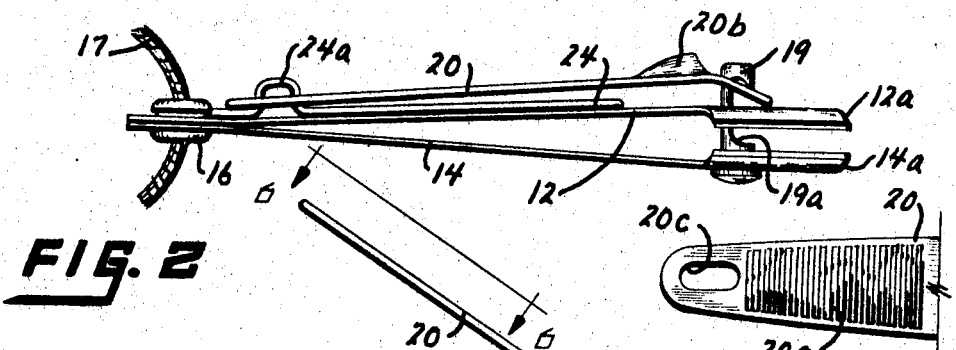
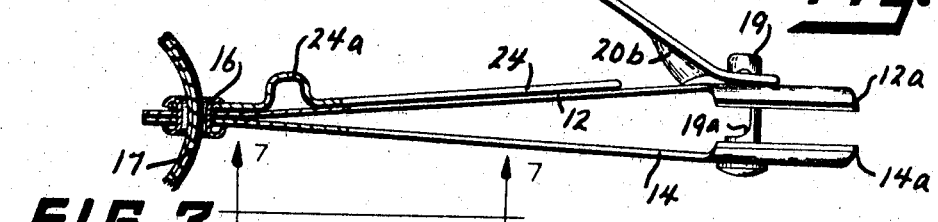
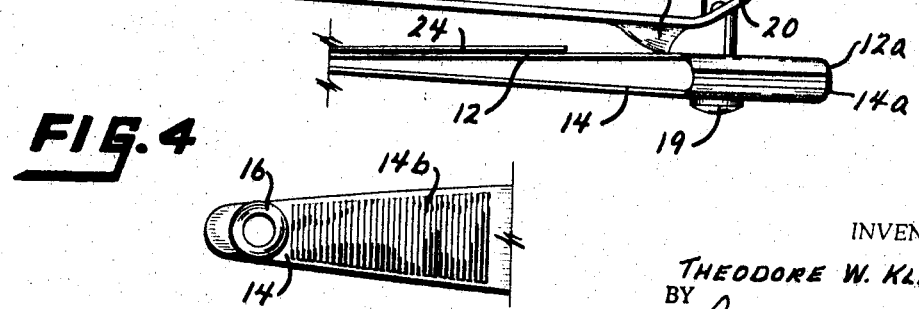
INVENTOR.
THEODORE W. KLEIMAN
BY
*Attorney*

United States Patent Office 3,447,173
Patented June 3, 1969

3,447,173
FISHING LINE CLIPPER
Theodore W. Kleiman, 4620 Kratzville Road,
Evansville, Ind. 47710
Filed May 29, 1967, Ser. No. 641,850
Int. Cl. B26b 11/00; B67b 7/44; A45d 29/00
U.S. Cl. 7—14.3    3 Claims

ABSTRACT OF THE DISCLOSURE

A fishing line clipper characterized by cutting edges defining a continuous curve and including a hooking accessory as well as knurled surfaces for ease in gripping.

---

As is known, virtually all anglers trim a fishing line, including, by way of example, for fly, spin, surf, or plain casting, being mostly an on-the-site operation, and oftentimes carried out under difficult circumstances, as, for example, with poor light, and/or under wet conditions. The basic difficulty with cutters in use heretofore for such trimming resides in the unintentional cutting of the line while cutting the tail left from the knotted portion. Such disadvantage is basically due to the configuration of the cutting edges forming part of the clipper.

In addition to the need for cutting edges having an improved configuration, it is also desirable to have roughened or knurled surfaces on portions of the clipper to enable ready grasping even with wet hands. Furthermore, although not provided heretofore, a hooking accessory, as part of the clipper, would serve to afford many operating advantages.

The fishing line clipper forming the invention affords features not presently available or in use, and provides for the desired needs of the fisherman. In this connection, the cutting edges defining the clipper assume a continuous curved configuration, unlike any clippers on the market heretofore. Such a curved cutting edge configuration prevents the cutting of the fishing line while removing the tail beyond the knot after the tying operation. Additionally, a hooking accessory is provided, pivotal for use, as well as knurled or roughened surfaces to provide for easy handling of the clipper.

A better understanding of the invention will become more apparent from the following description, taken in conjunction with the accompanying drawing, wherein—

FIG. 1 is a top plan view of the clipper defining the invention;

FIG. 2 is a view in side elevation of the invention, looking from front to back in FIG. 1;

FIG. 3 is a view in side elevation of the clipper in condition for use;

FIG. 4 is a view in side elevation, comparing with FIG. 3, but showing the clipper with the cutting edges in cutting position;

FIG. 5 is a view in vertical section, taken at line 5—5 of FIG. 1 and looking in the direction of the arrows, showing details of the cutting edges;

FIG. 6 is a fragmentary view, taken at line 6—6 of FIG. 3 and looking in the direction of the arrows, showing a knurled or roughened portion disposed on a surface of the invention;

FIG. 7 is another fragmentary view, taken at line 7—7 of FIG. 3 and looking in the direction of the arrows, showing another roughened or knurled portion on the surface of the invention; and, FIG. 8 is a plan view, partly fragmentary, and comparing in part with FIG. 1, showing the tail being cut from the fishing line after the tying operation.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the clipper 10 defining the invention comprises a top member 12 and a bottom member 14, connected at one end by a grommet 16, where an opening through the latter receives, typically, a cord 17 so that the clipper 10 may be secured to the user's person or fishing equipment. A rotatable pin 19 extends upwardly from the bottom member 14 and has a cut-out portion 19a, where an operating member 20 is positioned in such cut-out portion 19a.

Most importantly, outer or free ends 12a and 14a of the top member 12 and the bottom member 14, respectively, each form a cutting edge. As should be evident from the figures, each cutting edge 12a and 14a is defined as a continuous curve extending between the side edges of the respective top member 12 and bottom member 14, being definable, in the alternative, as partially alliptical in plan view. The curved cutting edges 12a and 14a prevent any unwanted cutting of fishing line 30 while the user is cutting the tail 30a from the knot after the tying operation of a fly, a relationship particularly evident in FIG. 8.

The invention further includes knurled portions 20a and 14b, shown in FIGS 6 and 7. Such knurled portions 20a and 14b are of considerable importance during the cutting operation, providing ease in gripping the clipper. In this regard, and when in use, the operating member 20 is reversed in position, where a cammed portion 20b thereon, with downward movement of the operating member 20, effects downward movement of the top member 12, from the position of FIG. 3, to the position of FIG. 4, the latter illustrating the cutting position of the cutting edges 12a and 14a.

With reference now to FIGS. 1, 2, 3 and 4, a novel feature in the form of a hook accessory 24 is provided as part of the invention, being pivotally mounted at the grommet 16. As evident in the drawing, the hooking accessory 24 has a U-type or raised portion 24a along its length, such raised portion 24a being received in an opening 20c in the operating member 20. Such a relationship is provided so that the hooking accessory 24 can be maintained in a locked position, when desired.

The end or hook of the hooking accessory 24 is needle sharp, and is provided for numerous end uses, including, among others, the cleaning of the fishing hook eyes, the untying of backlashes in the reel, the tying and untying of knots and leaders in monofilament lines, and the like.

From the preceding, it should be apparent that the clipper defining the invention presents an important cutting blade configuration which eliminates the unwanted cutting of a fishing line by the user, as when the tail beyond the knot of a fly is being removed. The clipper provides the same excellent results if used by either a right handed or left handed person, or even upside down. Moreover, with the inclusion of the roughened or knurled portions on the surfaces of the clipper, ready handling is provided. The hooking accessory provides a further convenience for the fisherman, yet may be safely positioned when the clipper is not in use.

The clipper is susceptible to various changes within the spirit of the invention, including, by way of example, proportioning and the like. Thus, the above description should be considered illustrative and not as limiting the scope of the following claims.

I claim:
1. A clipper for a fishing line comprising a top member, a bottom member and an operating member in assembled relationship, one end of said top member and one end of said bottom member each defining a cutting edge, said cutting edges each having a configuration in the form of a partial elliptical curve extending between and blending into the side edges of said top member and said bottom member and symmetrical therewith.

2. The fishing line clipper of claim 1 where a portion of the surface of said operating member and said bottom member is roughened.

3. The fishing line clipper of claim 1 where a hooking member is pivotal at the ends of said top and bottom members opposite said cutting edges, movable from a locked position beneath a portion of said operating member, where said pivotal hooking member has a raised portion, and where said operating member has an opening for receiving said raised portion.

References Cited

UNITED STATES PATENTS

| | | | |
|---|---|---|---|
| 1,081,896 | 12/1913 | Eckler | 132—75.5 X |
| 1,297,797 | 3/1919 | Cheselka | 7—16 |
| 2,739,379 | 3/1956 | Bassett | 30—28 X |
| 3,042,047 | 7/1962 | Plaskon | 30—28 X |
| 3,150,892 | 9/1964 | Kosrow | 289—17 |

LESTER M. SWINGLE, *Primary Examiner.*

R. V. PARKER, Jr., *Assistant Examiner.*

U.S. Cl. X.R.

7—16; 30—28; 132—75.5